United States Patent Office 3,784,525
Patented Jan. 8, 1974

3,784,525
LONG-CHAIN DIGLYCIDYL ESTERS
Dieter Baumann, Birsfelden, and Juergen Habermeier, Pfeffingen, Switzerland, assignors to Ciba-Geigy Corporation, Ardsley, N.Y.
No Drawing. Filed Apr. 12, 1972, Ser. No. 243,459
Int. Cl. C08f 27/00; C07d 1/18
U.S. Cl. 260—78.4 EP                           6 Claims

ABSTRACT OF THE DISCLOSURE

New diglycidyl esters are obtained by glycidylizing butadiene-acrylonitrile copolymers or butadiene polymers which have terminal carboxyl group. The new diglycidyl esters can be converted into flexible mouldings or coatings by curing with conventional epoxide resin hardeners, with the flexibility of the mouldings being to a relatively large extent independent of the temperature and being retained up to −50° C.

---

It is known that by adding flexibilizers, such as polyalkylene glycols or long-chain dicarboxylic acids, to curable epoxide resin mixtures, it is possible to increase the flexibility of the moulded articles manufactured therefrom. In this manner, moulded articles are obtained which have in some measure a greater deflection. However, these known flexible mouldings possess a number of serious disadvantages. The mouldings, which at room temperature are still very readily flexible, display very rapidly at low temperatures a pronounced brittleness. Finally, when subjected to mechanical or electrical stress over a lengthy period of time the thus plasticized mouldings often exhibit a marked cold flow already at room temperature.

In "Rubber World," October 1968, page 51, the further suggestion was made to increase the flexibility of the moulded articles which can be manufactured from curable epoxide resin mixtures by adding butadiene-acrylonitrile copolymers which have terminal carboxyl groups. The moulded articles manufactured from these curable mixtures, however, do not satisfy in every respect the mechanical demands made on them, in particular the flexibility at low temperatures, i.e. those below freezing point.

The discovery has now been made that, by glycidylation of butadiene-acrylonitrile copolymers which have terminal carboxyl groups, new flexible diglycidyl esters are obtained which, by curing with conventional hardeners for epoxide resins, such as carboxylic anhydrides, polycarboxylic acids, polyamines or curing catalysts, can be converted into flexible, impact resistant moulded articles or coatings which surprising do not possess the disadvantages cited above, or possess them in greatly diminished measure. In particular, the flexibility of the moulded articles manufactured from the new diglycidyl esters is to a relatively large extent independent of temperature, and the flexibility of the new mouldings is retained up to −50° C. This factor opens up whole new perspectives for the application of these new flexible diglycidyl esters, particularly in the casting, impregnating and laminating resin sector and that of bonders, as are used in the preparation of elastic barrier sheets of structural parts which are exposed to alternating temperature stresses, for example suspension insulators.

The present invention therefore relates to new diglycidyl esters of the formula

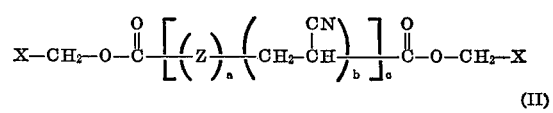

(I)

wherein Z represents a radical of the formula $$-CH_2-CH=CH-CH_2$$

or of the formula

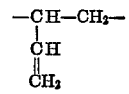

and wherein $a$ represents a number from 1 to 10, $b$ represents a number from 0 to 5 and $c$ represents a number from 1 to 30.

In the above formula, $a$ preferably represents a number from 2 to 7, $b$ represents a number from 0 to 3 and $c$ represents a number from 5 to 15.

The new diglycidyl esters are manufactured by methods which are known per se. The procedure preferably is that, in a compound of the formula

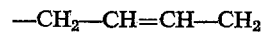

(II)

wherein Z, $a$, $b$ and $c$ have the meanings given hereinabove and the radicals X are radicals which can be converted into 1,2-epoxyethyl or 1-methyl-1,2-epoxyethyl radical, these radicals are so converted.

A radical X which can be converted into a 1,2-epoxyethyl radical is chiefly a hydroxy-halogenoethyl radical which carries the funcational groups at different carbon atoms, in particular a 2-halogeno-1-hydroxyethyl radical or a 2-halogeno-1-hydroxy-1-methyl-ethyl radical. In this context, halogen atoms are in particular chlorine or bromine atoms. The reaction takes place in the conventional manner, principally in the presence of dehydrohalogenating agents, such as strong alkalis, for example anhydrous sodium hydroxide or aqueous sodium hydroxide solution. However, other strong alkaline reagents, such as potassium hydroxide, barium hydroxide, calcium hydroxide, sodium carbonate or potassium carbonate may also be used.

A further radical which may be converted into the 1,2-epoxyethyl radical is, for example, the ethenyl radical, which can be converted into the 1,2-epoxyethyl radical in known manner, principally by reaction with hydrogen peroxide or peracids, for example peracetic, perbenzoic or monoperphthalic acid.

The starting materials of the Formula II are obtained in known manner. Thus, for example, it is possible to react a dicarboxylic acid of the formula

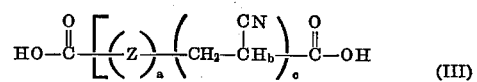

(III)

or its disodium salt, wherein Z, $a$, $b$ and C have the meanings given hereinabove, with a compound of the formula X—CH—₂—Hal, wherein Hal represents a halogen atom and X has the meaning given hereinabove. Preferably, the compound of the Formula III is reacted with an epihalogenohydrin or β-methylepihalogenohydrin, primarily epichlorohydrin or β-methylepichlorohydrin, in the presence of a catalyst, in particular a tertiary amine, a quaternary ammonium base or a quaternary ammonium salt. Suitable catalysts for the addition of epichlorohydrin are above all tertiary amines, such as triethylamine, tri-n-propylamine, benzyldimethylamine, N,N-di-methylaniline and triethanolamine; quaternary ammonium bases, such as benzyl trimethylammonium hydroxide; quaternary ammonium salts, such as tetramethylammonium chloride, tetraethylammonium chloride, benzyltrimethylammonium chloride, benzyltrimethylammonium acetate, methyltriethylammonium chloride; hydrazines containing a tertiary nitrogen atom, for example 1,1-dimethylhydrazine, which may also be used in quaternized form; alkali halides, such as lithium chloride, potassium chloride, sodium chloride, bromide or fluoride; also ion exchange resins containing tertiary or quaternary amino groups, as well as ion exchangers containing acid amide groups. The process may also be carried out without catalysts.

The invention relates also to those embodiments of the process in which a start is made from a compound obtainable as an intermediate product at any stage and the missing steps of the process are carried out, or in which a starting material is formed under the reaction conditions and further processed without being isolated.

A preferred embodiment of the process therefore consists, for example, in reacting an epihalogenohydrin or β-methylepihalogenohydrin, preferably an epichlorohydrin or a β-methylepichlorohydrin, in the presence of a catalyst, preferably a tertiary amine, a quaternary ammonium base or a quaternary ammonium salt, with a compound of the Formula III and, in a second step, treating the resulting product containing halogenohydrin groups with dehydrohalogenating agents. In these reactions, the process is carried out in the manner described above, wherein the compounds cited above may be used as catalysts for the addition of epihalogenohydrin or β-methylepihalogenohydrin and for the dehydrohalogenation. Particularly good yields are obtained if an excess of epichlorohydrin or β-methylepichlorohydrin is used. A partial epoxidation of the dichlorohydrin or the dichloro-β-methylhydrin ester groups of the dicarboxylic acid takes place already during the first reaction, before the addition of alkali. The epichlorohydrin or β-methylepichlorohydrin, which act as hydrogen chloride acceptors, are then partially converted into glycerol-dichlorohydrin or β-methylglyceroldichlorohydrin.

The addition of the epihalogenohydrin or β-methylepihalogenohydrin to the dicarboxylic acid of the Formula III may take place according to known processes with or without solvents and with a small or large excess of epichlorohydrin, at temperatures up to 140° C. accompanied by the catalytic action of tertiary amines, quaternary ammonium salts, alkylhalides and other catalysts having anionic action, in 30 to 360 minutes. The subsequent dehydrohalogenation may take place at 40° C. to 70° C. with solid or liquid alkalis and, optionally, accompanied by azeotropic distillation of the water which forms. The isolation of the alkali halide is carried out by known processes. The resulting diglycidyl or di-β-methylglycidyl ester derivatives are isolated by distilling off the epihalogenohydrin or β-methylepihalogenohydrin and, optionally, the solvent. They occur as a rule in the form of viscous liquids in yields of up to 100%.

The dicarboxylic acids of the Formula III are known compounds and may be easily manufactured, for example, by the process described in British Pat. No. 921,803 or that described in U.S. Pat. No. 3,324,188, by polymerizing or copolymerizing the corresponding monomer mixture in a solution and in the presence of alkali metal catalysts or radical formers, and treating the resulting product with $CO_2$.

The diglycidyl esters according to the invention of the Formula I react with the conventional hardeners for epoxide compounds. They can therefore be cross-linked or cured by the addition of such hardeners in the same way as other polyfunctional epoxide compounds. Basic or acid compounds are suitable as such hardeners.

As examples of suitable hardeners there may be cited: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N - diethylpropylenediamine-1,3, 2,2 - bis(4' - aminocyclohexyl)propane, 3,5,5-trimethyl-3-(aminomethyl) - cyclohexylamine ("Isophorondiamin"), Mannich bases, such as 2,4,6-tris(dimethylaminomethyl) - phenyl; m - phenylenediamine, p-phenylenediamine, bis(4-aminophenyl)methane, bis (4-aminophenyl)sulphone, m-xylylenediamine; adducts of acrylonitrile or monoepoxide, such as ethylene oxide or propylene oxide, to polyalkylenepolyamines, such as diethylenetriamine or triethylenetetramine; adducts of polyamines, such as diethylenetriamine or triethylenetetramine, in excess, and polyepoxies, such as diomethane-polyglycidyl ethers; ketimines, for example from acetone or methyl ethyl ketone and bis (p-aminophenyl)-methane; adducts from monophenols or polyphenols and polyamines; polyamides, in particular those from aliphatic polyamines, such as diethylenetriamine or triethylenetetramine, and di- or trimerized unsaturated fatty acids, such as dimerized linseed oil fatty acid (Versamid); polymer polysulphides (Thiokol); dicyandiamide, aniline/formaldehyde resins; polyvalent phenols, for example resorcinol, 2,2-bis(4-hydroxyphenyl) propane or phenol/formaldehyde resins; boron trifluoride and its complexes with organic compounds, such as $BF_3$-ether complexes and $BF_3$-amine complexes, for example $BF_3$-monoethylamine complex; acetoacetanilide-$BF_2$ complex; phosphoric acid; triphenyl phosphite; polybasic carboxylic acids and anhydrides thereof, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6-endomethylene-$\Delta^4$-tetrahydrophthalic anhydride (=methylnadicane hydride), 3,4,5,6,7,7-hexachloro - 3,6 - endomethylene-$\Delta^4$-tetrahydrophthalic anhydride, succinic anhydride, adipic anhydride, trimethyladipic anhydride, azelaic anhydride, sebacic anhydride, maleic anhydride, dodecenylsuccinic anhydride; pyromellitic anhydride, or mixtures of such anhydrides.

It is possible, moreover, to use curing accelerators in the curing, and particularly polyamides, dicyandiamides, polymer polysulphides or polycarboxylic anhydrides are used as hardeners. Exemplary of such accelerators are: tertiary amines, salts thereof or quaternary ammonium compounds, for example 2,4,6 - tris(dimethylaminomethyl)phenol, benzyldimethylamine, 2 - ethyl - 4 - methylimidazole, triamylammonium phenolate; or alkali metal alcoholates, for example sodium hexane triolate.

The term "curing" as used in the present context means the conversion of the instant diglycidyl esters into insoluble and infusible cross-linked products, and, as a general rule, accompanied by simultaneous moulding to form moulded articles, such as castings, pressed articles or laminates, and to form sheet or filmlike structures such as coatings, lacquers, films or bonds.

If desired, it is possible to add active diluents to the diglycidyl esters to lower the viscosity, for example styrene oxide, butyl glycidyl ether, isooctylglycidyl ether, phenylglycidyl ether, cresyl glycidyl ether, glycidyl esters of synthetic, highly branched, principally tertiary aliphatic monocarboxylic acids (Cardura E) or cycloaliphatic monoepoxides, such as 3-vinyl - 2,4 - dioxaspiro-(5,5)-9,10-epoxy-undecane.

The diglycidyl esters according to the invention are also suitable for palsticizing other curable di- or polyepoxide compounds. As examples there may be cited: polyglycidyl ethers of polyvalent alcohols, such as 1,4-butane diol, 1,3 - bis - (2' - hydroxy-n-propyl) - 5,5 - dimethyl hydantoin, polyethylene glycols, polypropylene glycols or 2,2 - bis(4' - hydroxycyclohexyl)propane; polyglycidyl ethers of polyvalent phenols, such as 2,2-bis-(4'-hydroxyphenyl) - 3',5' - di-bromo-phenyl)propane, bis (4 - hydroxy phenyl)sulphone, 1,1,2,2 - tetrakis(4' - hydroxyphenyl)ethane, or condensation products of formaldehyde and phenol which are manufactured in acid medium, for example phenol novalaks or cresol novalaks; also di- or poly(β-methylglycidyl)-ethers of the above cited polyalcohols and polyphenols; polyglycidyl esters of polycarboxylic acids, for example phthalic acid diglycidyl ester, tetrahydrophthalic acid diglycidyl ester or hexahydrophthalic acid diglycidyl ester; triglycidylisocyanurate; N,N'-diglycidyl - 5,5 - dimethyl hydantoin, 1 - glycidyl-3(glycidyloxypropyl) - 5,5 - dimethyl hydantoin, 1 - glycidyloxymethyl - 3 - glycidyl - 5,5 - dimethyl hydantoin, aminopolyepoxides such as are obtained by dehydrohalogenation of reaction products of epihalogenohydrin and primary and secondary amines, for example aniline or 4,4' - diamino - diphenylmethane; in addition, alicyclic compounds which contain several epoxide groups, for example vinylcyclohexane diepoxide, dicyclopentadiene diepoxide, ethylene glycol-bis - (3,3 - epoxytetrahydrodicyclopentadien - 8 - yl) - ether, bis(3,4 - epoxycyclohexylmethyl)adipate, (3',4' - epoxycyclohexylmethyl) - 3,4-epoxycyclohexane carboxylate, (3',4' - epoxy - 6' - methylcyclohexylmethyl) - 3,4 - epoxy - 6 - methylcyclohexane carboxylate, bis(cyclopentyl)ether diepoxide or 3-(3',4'-epoxycyclohexyl) - 2,4 - dioxaspiro - (5,5) - 9,10-epoxy-undecane.

The present invention therefore also relates to curable mixtures which are suitable for the manufacture of moulded articles, including film or sheet-like structures, and contain the diglycidyl esters according to the invention, optionally together with other di- or polyepoxide compounds, and also hardeners for epoxy resins, such as polyamines or polycarboxylic anhydrides.

The polyglycidyl esters according to the invention or mixtures thereof with other polyepoxide compounds and/or hardeners can also be treated before the curing, and in any phase, with conventional modifying agents, for example extenders, and in any phase, with conventional modifying agents, for example extenders, fillers reinforcing agents, pigments, dyestuffs, plasticizers levelling agents, thixotropizing agents, flame retarding substances, mould release agents or stabilizers, in particular those which are effective against autoxidation or ozonization.

As examples of extenders, reinforcing agents, fillers and pigments which can be used in the curable mixtures according to the invention there may be cited: bituminous coal tar, bitumen, glass fibres, boron fibres, carbon fibres, cellulose, polyethylene powder, polypropylene powder, mica, asbestos, quartz powder, powdered slate, aluminium oxide trihydrate, chalk powder, gypsum, antimony trioxide, bentone, silica acrogel (Aerosil), lithopone, barytes, titanium dioxide, carbon black, graphite, iron oxide or metal powders, such as aluminium powder or iron powder.

Examples of suitable organic solvents for the modification of the curable mixtures are: toluene, xylene, n-propanol, butyl acetate, acetone, methyl ethyl ketone, diacetone alcohol, ethylene glycol monomethyl ethyl, monoethyl ether and monobutyl ether.

Specially for the application in the lacquer field, the new diepoxides can also be partially or completely esterified in known manner with carboxylic acids, in particular higher unsaturated fatty acids. It is also possible to add other curable synthetic resins, for example phenolic plastics or aminoplasts, to such coating resin formulations.

The curable mixtures may be used in the unfilled or filled state, optionally in the form of solutions or emulsions, as laminating resins, paints, lacquers, dipping resins, impregnating resins, casting resins, compression moulding compositions, sintering powders, coating compositions and fillers, floor covering compositions, embedding and insulation materials in electrical engineering, binders, as well as for manufacturing such products.

Cured moulded articles from this resin have a good heat stability and good electrical properties in the case of their possessing good mechanical properties.

The following examples illustrate the invention, the parts and percentages being by weight unless otherwise stated.

Example 1

A mixture of 1605 g. (0.6 mol) of a butadiene acrylonitrile copolymer having terminal carboxyl groups of the formula

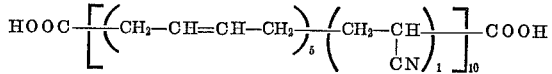

(a product commercially obtainable under the registered trademark "Hycar CTBN"), 4155 g. (44.92 mols) of epichlorohydrin and 4.98 g. of tetraethylammonium chloride is stirred for 40 minutes at 90° C. Then by applying a vacuum at a bath temperature of 120–125° C., a cyclic distillation at 40–90 torr is regulated in such a manner that a string distillation results at 57–60° C.

While stirring thoroughly, 120 g. (1.5 mols) of 50% aqueous sodium hydroxide solution are then slowly added dropwise within 140 minutes. In the course thereof, the water present in the reaction mixture is continuously removed from the batch by the azeotropic cyclic distillation and isolated. Upon addition of the sodium hydroxide solution, distillation is carried out again for 20 minutes with vigorous stirring in order to bring the reaction to completion. The batch is diluted with 500 ml. of epichlorohydrin and filtered through a suction filter over a bed of diatomaceous earth (registered trademark "Hyflo"), whereupon the bulk of the sodium chloride which has formed during the reaction is isolated.

The organic phase is washed with 200 ml. of water, isolated, and concentrated at 60° C. bath temperature in a water-jet vacuum in a rotary evaporator. To remove volatile constituents, 150 ml. of water are added and distilled off; this procedure is subsequently repeated with 150 ml. of toluene. The product is then concentrated to dryness and the residue dried at 60° C. at 0.2 torr to constant weight. 1421 grams (85% of theory) of a light brown, faintly cloudy resin are obtained, which has an epoxide content of 0.56 epoxide equivalents/kg. (78% of theory). The total chlorine content is 0.5%.

The new diglycidyl ester corresponds on average to the following structure:

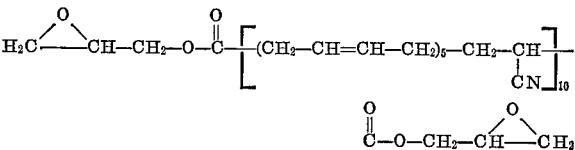

Example 2

The experiment according to Example 1 is repeated, but 10 g. of 50% aqueous tetraethylammonium chloride solution are used instead of 4.98 g. of tetraethylammonium chloride. The dehydrohalogenation is carried out in 120 minutes at 55° C. Instead of the filtration, the bulk of the sodium chloride is then centrifuged off. The epichlorohydrin solution is then washed with 700 ml. of 50% alcohol which contains 0.5 part by weight of sodium dihydrogen phosphate. The organic phase is isolated and processed as described in Example 1, to yield 1488 g. (89.3% of theory) of a clear, light brown diglycidyl ester containing 0.63 epoxide equivalents/kg. (=87.8% theory). The total content of chlorine is 0.6%. The new diglycidyl ester corresponds on average to the following structure:

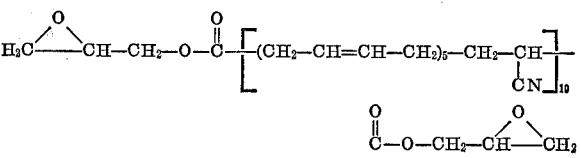

Example 3

A solution of 583 g. (corresponding to 0.431 mol) of a butadiene polymer having terminal carboxyl groups of the formula

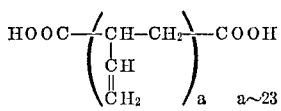

(a commercial product obtainable under the registered trademark "Hystl c 1000") in 3100 g. of epichlorohydrin (35.4 mols) is stirred for 45 minutes with 8.63 g. of a 50% aqueous tetramethylammonium chloride solution at 90° C. Dehydrohalogenation is then carried out with 82.9 g. of 50% aqueous sodium hydroxide solution (1.035 mols) as is described in more detail in Example 1. The processing and isolation of the product take place likewise as described in Example 1. A viscous yellow resin (601 g.), which contains 1.09 equivalents/kg. (79.7% of theory), is obtained in 95.4% yield. The total content of chlorine is 0.61%. The new resin consists essentially of:

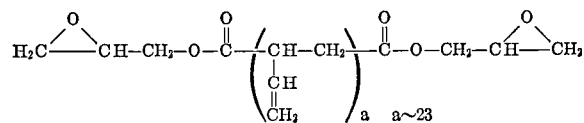

USE EXAMPLES

Example I 100 parts of the epoxide resin manufactured according to Example 1 are mixed at 120° C. with 15 parts of tri-methyladipic anhydride and 3 parts of a curing accelerator consisting of a sodium alcoholate solution which is obtained by dissolving 0.82 part of sodium metal in 100 parts of 3-hydroxymethyl-2,4-dihydroxypentane at elevated temperature, and the mix is poured into hollow aluminium moulds preheated to 120° C. cured for 12 hours at 120° C. The resulting flexible moulded articles possess the following mechanical and electrical properties:

Tensile strength according to VSM 77 101=0.08–0.12 kp./mm.$^2$
Elongation according to VSM 77 101=120–150%
Water absorption after 4 days at 25° C., test speciment 60 x 40 x 4 mm.=0.35–0.45%
Glass transition point, ascertained from the torsional wave test according to DIN 53 445=—48° C.
Dielectric loss factor $T_g$ (50 Hz.) at 25° C.=3.5%

Example II 100 parts of the epoxide resin manufactured according to Example I are mixed at 120° C. with 15 parts of tri-methyladipic anhydride, 3 parts of a curing accelerator consisting of a sodium alcoholate solution which is obtained by dissolving 0.82 part of sodium metal in 100 parts of 3 - hydroxymethyl-2,4-dihydroxypentane at elevated temperature, and 1 part of a stabilizer which is active against autoxidation and ozonization and obtainable commercially under the registered trademark "Irganox" of Ciba-Geigy AG. The mix is poured into hollow aluminium moulds preheated to 120° C. and cured for 12 hours at 120° C. The test articles were subjected to a heat ageing for up to 140 days at 80° C., in which Shore hardness A was taken as physical property value. The test readings are contained in the following table. As the readings show, no embrittlement of the material of any kind occurs in air at 80° C. even after 140 days, a factor proved by no rise in the Shore hardness A.

Table 1: Shore hardness A of the test articles after storage at 80° C. over several days.

| Time (days): | Shore hardness A |
|---|---|
| None | 39 |
| 5 | 38 |
| 15 | 37 |
| 30 | 35 |
| 60 | 40 |
| 90 | 35 |
| 140 | 35 |

Example III 100 parts of the epoxide resin manufactured according to Example 3 are mixed at 120° C. with 20 parts of tri-methyladipic anhydride and 1 part of the curing accelerator benzyldimethylamine and the mix is poured into hollow aluminium moulds preheated to 120° C. for 12 hours. The resulting flexible moulded articles possess the following mechanical properties:

Tensile strength according to VSM 77101=0.05–0.1 kp./mm.$^2$
Elongation according to VSM 77101=40–60%
Water absorption after 1 hour at 100° C., test specimen 60 x 40 x 4 mm.=0.2–0.3%
Glass transition point, ascertained from the torsional wave test according to DIN 53,445=—5° C.

Example IV 100 parts of the epoxide resin manufactured according to Example I are mixed at 120° C. with 8.4 parts of hexa-hydrophthalic anhydride and 3 parts of the curing accelerator used in Example I and the mix is poured into hollow aluminium moulds preheated to 120° C. and cured for 12 hours at 120° C.

The resulting flexible moulded articles possess the following mechanical properties:

Tensile strength according to VSM 77101=0.07–1.0 kg./mm.$^2$
Elongation according to VSM 77101=100–150%
Glass transition point, ascertained from the torsional wave test according to DIN 53,445=—52° C.

Example V 100 parts of the epoxide resin manufactured according to Example I are mixed at 120° C. with 8 parts (1 mol per epoxide equivalent) of tetrahydrophthalic anhydride and 3 parts of the curing accelerator used in Example I and the mix is poured into hollow aluminium moulds preheated to 120° C. and cured for 12 hours at 120° C. The resulting flexible moulded articles possess the following mechanical properties:

Tensile strength according to VSM 77101=0.05–0.07 kg./mm.$^2$
Elongation according to VSM 77101=120–170%
Water absorption after 4 days at 25° C.; test specimen 60 x 40 x 4 mm.=0.8–1.0%

Example VI 100 parts of the epoxide resin obtained according to Example I are mixed at 120° C. with 20 parts (2.5 mols per epoxide equivalent) of tetrahydrophthalic anhydride and 3 parts of the curing accelerator used in Example I and the mix is poured into hollow aluminium moulds preheated to 120° C. and cured for 12 hours at 120° C.

The resulting flexible moulded articles possess the following mechanical properties:

Tensile strength according to VSM 77101=0.02 kp./mm.$^2$
Elongation according to VSM 77101=200–300%
Water absorption after 4 days at 25° C., test specimen 60 x 40 x 4 mm.=0.7–0.9%

We claim:
1. Diglycidyl ester of the formula

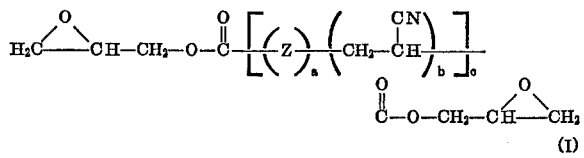

wherein Z represents a radical of the formula

—CH$_2$—CH=CH—CH$_2$ or of the formula

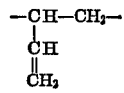

and in which $a$ represents a number from 1 to 10, $b$ represents a number from 0 to 5, and $c$ represents a number from 1 to 30.

2. Diglycidyl ester according to claim 1 of the formula

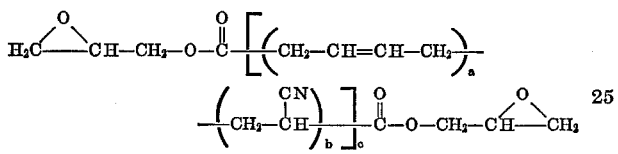

in which $a$ represents a number from 1 to 10, $b$ represents a number from 0 to 5, and $c$ represents a number from 1 to 30.

3. Diglycidyl ester according to claim 1 of the formula

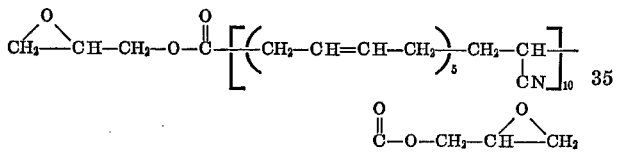

4. Diglycidyl esters according to claim 1 of the formula

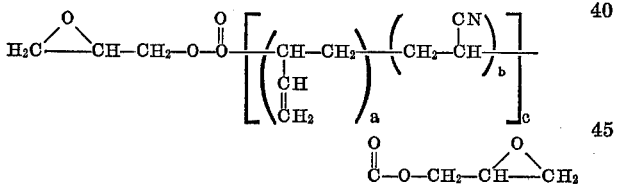

in which $a$ represents a number from 1 to 10, $b$ represents a number from 0 to 5 and $c$ represents a number from 1 to 30.

5. Diglycidyl ester according to claim 1 of the formula

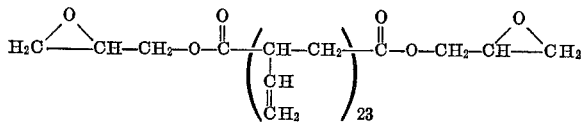

6. A composition of matter which comprises
(a) a diglycidyl ester of the formula

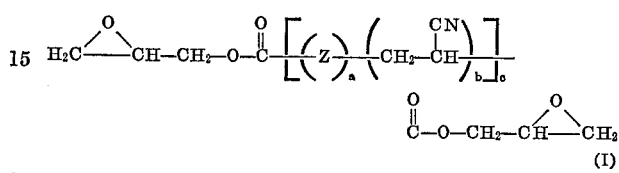

in which Z represents a radical of the formula

—CH$_2$—CH=CH—CH$_2$ or the formula

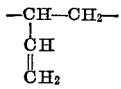

and in which $a$ represents a number from 1 to 10, $b$ represents a number from 0 to 5 and $c$ represents a number from 1 to 30,
(b) a curing agent for epoxide resins, and
(c) optionally antioxidant.

References Cited
UNITED STATES PATENTS

| | | | |
|---|---|---|---|
| 3,208,980 | 9/1965 | Gruver et al. | 260—78.4 |
| 3,644,431 | 2/1972 | Heer et al. | 260—348 A |
| 3,057,809 | 10/1962 | Newey | 260—18 |

JOSEPH L. SCHOFER, Primary Examiner

J. KIGHT III, Assistant Examiner

U.S. Cl. X.R.

260—348 A